Inventor:
Johannes Sobisch

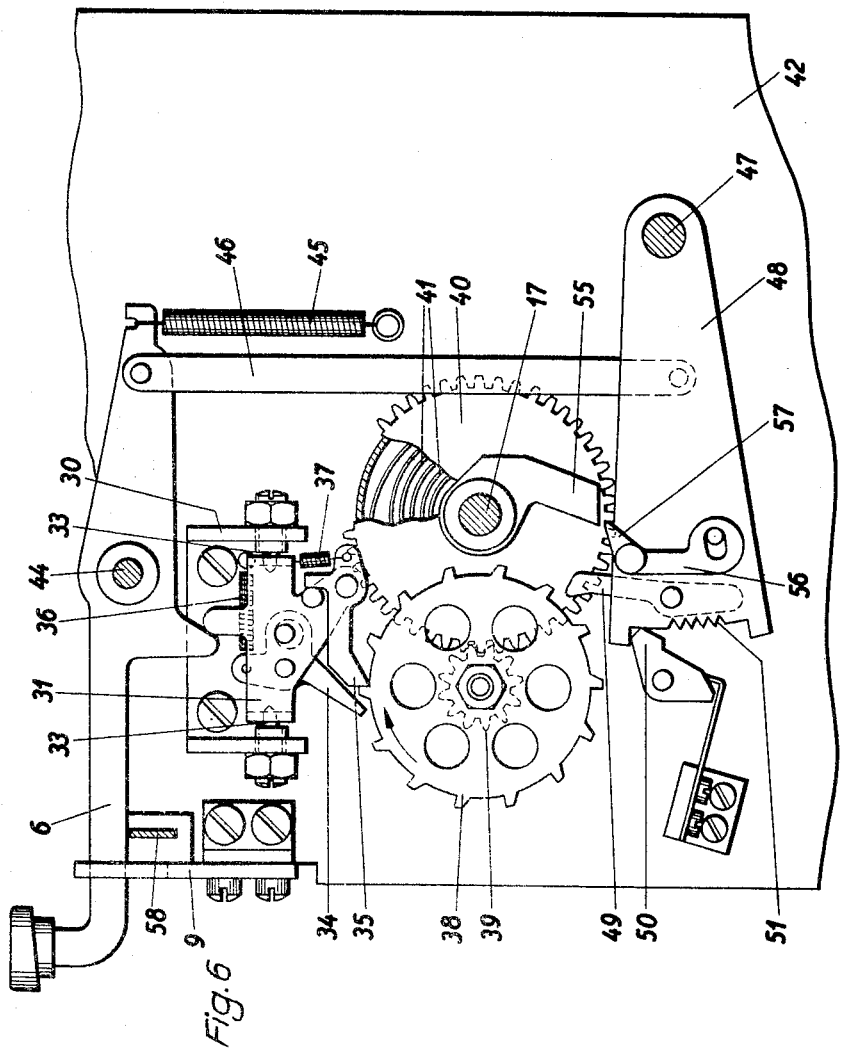

Oct. 2, 1956  J. SOBISCH  2,765,116
DATA STORING APPARATUS FOR BUSINESS MACHINES, PARTICULARLY
ACCOUNTING MACHINES OR THE LIKE
Filed Nov. 3, 1953  11 Sheets-Sheet 8

Inventor:
Johannes Sobisch

Oct. 2, 1956   J. SOBISCH   2,765,116
DATA STORING APPARATUS FOR BUSINESS MACHINES, PARTICULARLY
ACCOUNTING MACHINES OR THE LIKE
Filed Nov. 3, 1953   11 Sheets-Sheet 9

Inventor:

Johannes Sobisch

United States Patent Office 2,765,116
Patented Oct. 2, 1956

2,765,116

DATA STORING APPARATUS FOR BUSINESS MACHINES, PARTICULARLY ACCOUNTING MACHINES OR THE LIKE

Johannes Sobisch, Bielefeld, Germany, assignor to Anker-Werke Aktiengesellschaft, Bielefeld, Germany, a corporation of Germany Application November 3, 1953, Serial No. 390,069

Claims priority, application Germany November 26, 1952

14 Claims. (Cl. 235—61)

Accounting machines and similar business machines are usually equipped with a keyboard for entering the accounting data. Depending upon the type of machine, the numerical data are entered by means of a full keyboard or by a ten-key board. Some machine types also have a text keyboard for entering letters or other characters, the latter keyboard being usually similar to that of a typewriter.

Dealing with such machines, my invention relates to a data storing apparatus controlled by a keyboard or other data-entering mechanism for the purpose of posting the entered numbers, letters or other characters until the stored data, by a subsequently initiated operation, are transferred into another machine or machine portion for further processing.

It is an object of my invention to devise a data-storing apparatus which, in contrast to the known data-storing devices, is better suitable for electrical scanning and transfer of the stored data and which, therefore, lends itself readily for use with a large variety of electrically controllable devices such as printing, card-punching, counting, calculating, and data-feeling or scanning devices.

According to my invention, in one of its aspects, I connect with the keyboard or other data-entering assembly a storing device which has a progressively displaceable assembly of contact members correlated to the individual keys or entering means and coacting with a group of stationary contact members so that, while an increasing number of individual data are being entered, a correspondingly increasing number of stationary contact members are occupied by the contact members of the assembly. I further control the assembly members by the respective data-entering means so that each actuation of a selected entering means causes only the correlated one of the assembly members to move to its active (i. e. circuit closing or opening) position relative to the stationary contact members. As a result, the storing device establishes during its progressive operation a multitude of selectively arranged electric circuits between selected members of the assembly and the stationary contact members. The particular selected assembly member of each circuit is then indicative of the stored character, while the particular stationary contact member of the same circuit, by its serial relation to the other stationary contact member, is accurately indicative of the time sequence in which that character was entered into the apparatus. Consequently, the selectively established circuits are then available for controlling, at any desired later moment, a printer, puncher, calculator or other device to operate in accordance with the previously entered and stored data.

The foregoing and more specific objects and features will be apparent from the embodiment shown on the drawings and described in the following with reference to the example of a keyboard-controlled storing apparatus for accounting purposes.

Fig. 4 is a section according to line B—B in Fig. 2.

Fig. 5 shows a modified design of contact bars.

Fig. 6 is a partial view taken from the right of Fig. 1 and shows a stepping drive for the movable contact assembly of the apparatus as well as a correlated back-space key.

Figure 1:
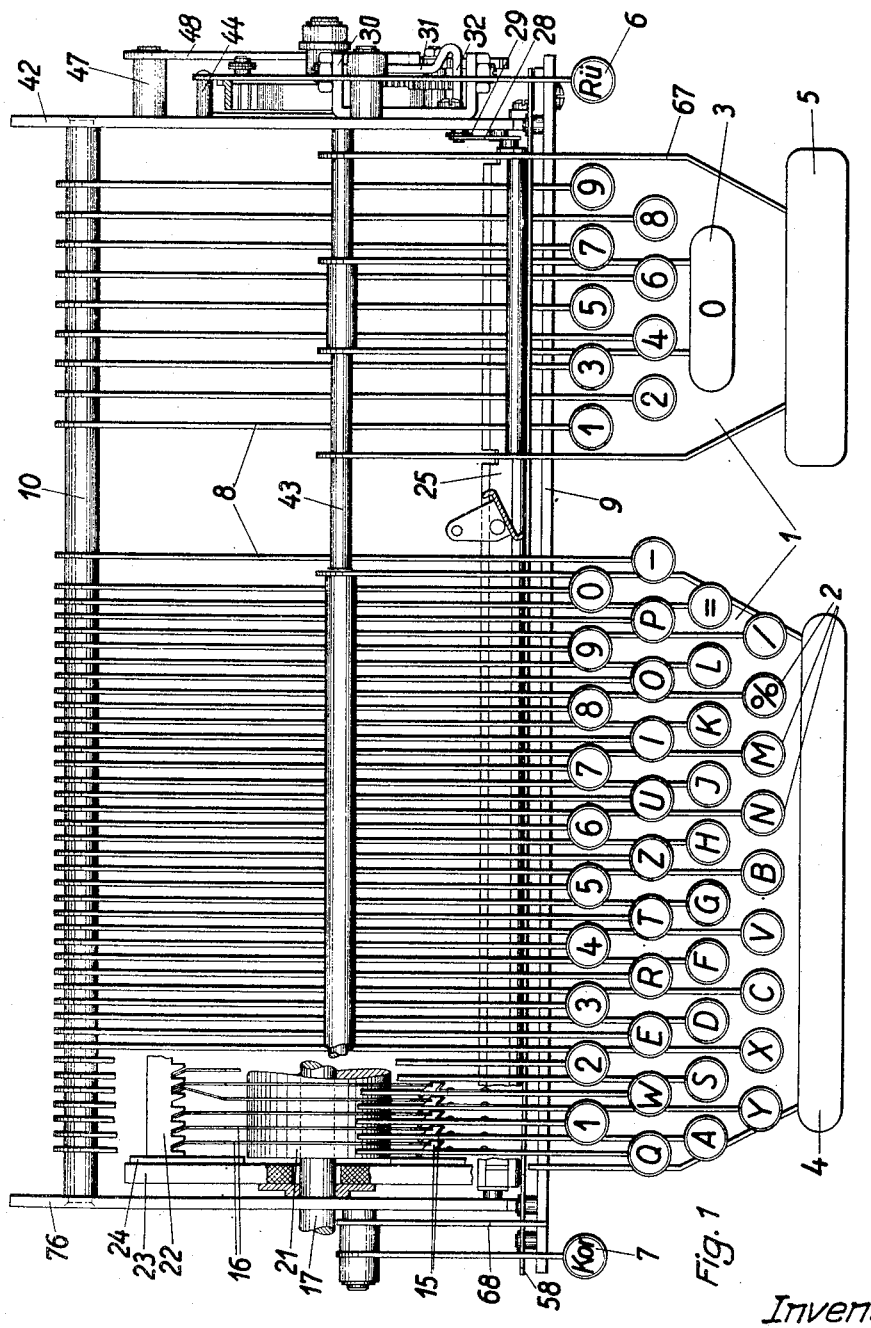
Fig. 1 is a top view of the apparatus, showing particularly the keyboard assembly.

The keyboard assembly 1 (Fig. 1) of the data-storing apparatus is partly similar to that of a conventional typewriter and partly similar to that of a calculating machine. It comprises a text field 2 and a number field 3. The number field 3 is of the ten-key type and serves to enter calculating amounts into the machine. The keyboard assembly is further equipped with a space bar 4, a motor bar 5, a back-space key 6 and a correction key 7. Each key has a lever 8 (Figs. 1 to 10) biased by a spring 8a. The levers 8 are guided in slots of a guide comb 9 and are pivotally movable about a common shaft 10. The guide comb 9 has two slots 11 and 12 for each of the respective key levers 8 (Fig. 2). The upper slot 11 limits the downward movement of the key lever when the key is being depressed. The lower slot 12 straddles a stop member 13 which is firmly joined with the key lever 8 and limits the upward return movement of the key lever. A slide cam 15 is riveted to each key lever 8 (Figs. 1 to 4).

Figure 2:
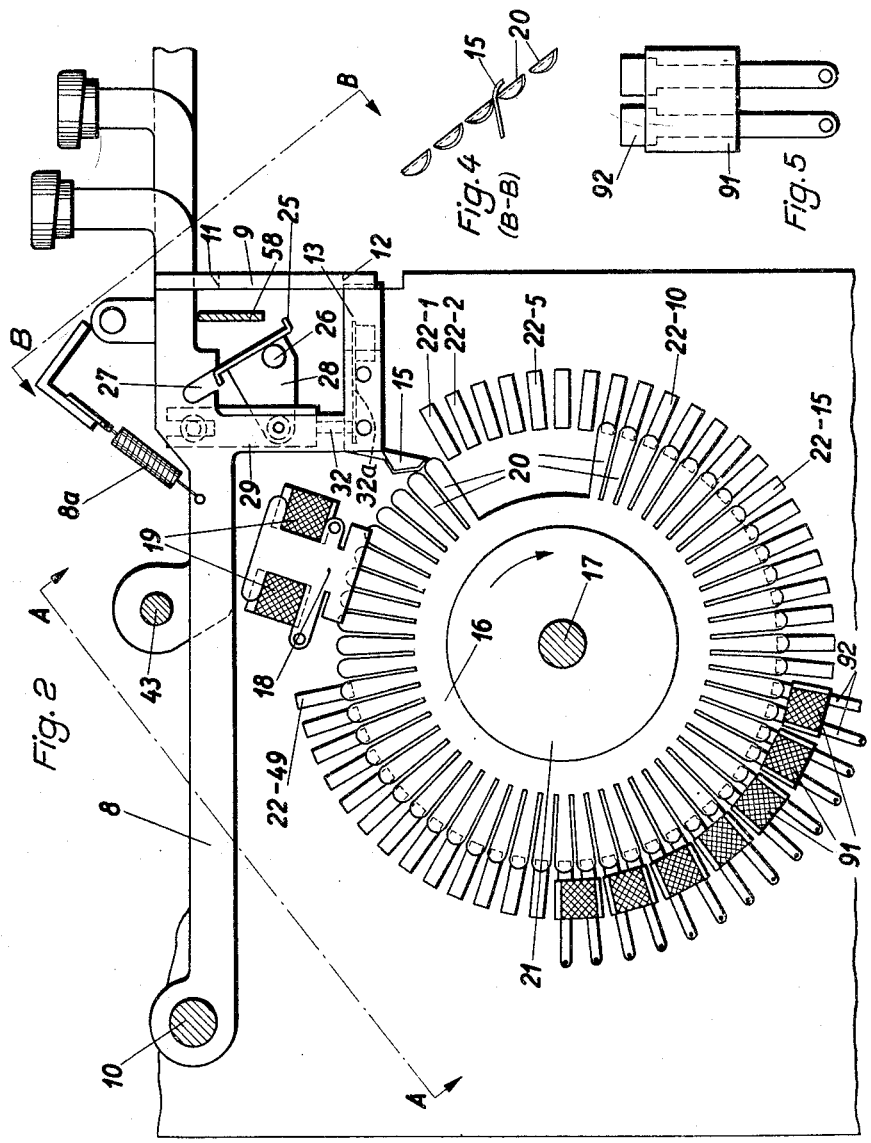
Fig. 2 is a vertical section.
Figure 3:
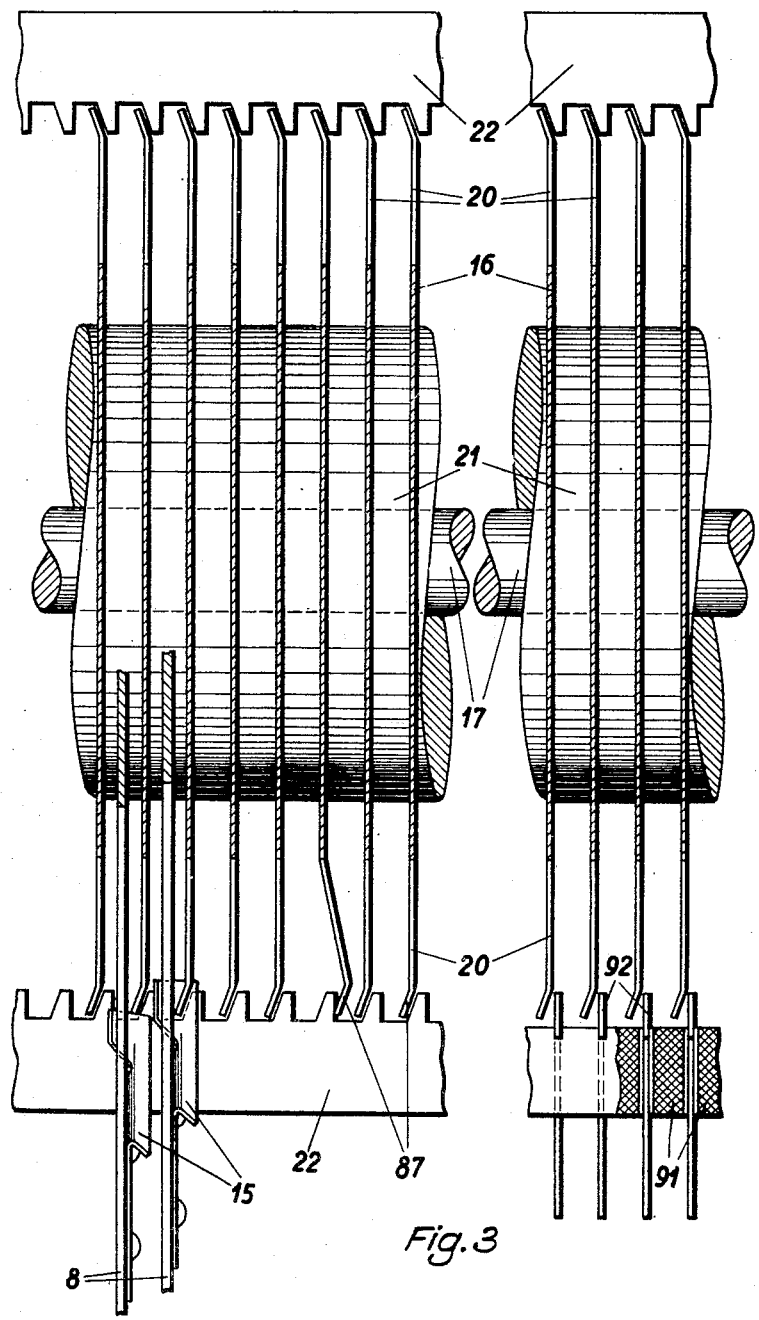
Fig. 3 is a cross section according to line A—A in Fig. 2.

Correlated to each key lever is a contact star 16 of spring material (Figs. 1 to 3). Each star has a multitude of axially deflectable tongues 20. All contact stars are coaxially mounted on a common shaft 17 and are insulated from the shaft as well as from each other. Each contact star 16 is slidably engaged by a stationary electric terminal contact 18 for connection of the contact star into a control circuit. The terminal contacts 18 are insulated from each other and are mounted on insulating carriers 19 (Fig. 2). Each terminal contact 18 is always in a conductive slide connection with several contact tongues 20 of the pertaining contact star 16.

The shaft 17 and the entire group of contact stars 16 mounted thereon form together a rotor assembly 21 (Figs. 1 to 3). Assembly 21 is rotated one angular division, corresponding to that of the tongues 20, whenever any one of the key levers 8 is actuated. A group of contact bars 22–1 to 22–49, each extending parallel to the rotor axis of assembly 21, are serially aligned along the major part of the periphery. During the incremental movement of assembly 21, the tongues 20 of the contact stars 16 are normally free to pass through marginal recesses of the peripherally aligned contact bars 22–1 to 22–49 (Figs. 1, 2, 3, 11). Hence, no electric contact is made between the tongues 20 and the contact bars (see Fig. 3) unless a tongue is deflected into an active position (at 37 in Fig. 3) in which it establishes a conductive connection with the contact bars. How this deflection is brought about will be described in a later place. The contact bars, hereinafter collectively denoted by 22, are insulated from each other and are firmly secured to the insulating plates 23, 24 that form part of the supporting frame structure of the apparatus.

A teeter rail 25 (Figs. 1, 2), extending across all key levers and engageable with all of them, serves to initiate the rotary step movements of the rotor assembly 21. The teeter rail 25 is pivotally mounted on a shaft 26 (Fig. 2) and is retained in the normal position by a leaf spring 32a. When any of the key levers 8 is being depressed, the teeter bar slides into a slanted recess 27 of that key lever (Fig. 2). The recesses 27 of the respective key levers are normally in alignment with each other. During the downward movement of a teeter bar, the recess 27 of the one key then being depressed forces the teeter rail 25 to turn slightly counterclockwise. This prevents the subsequent actuation of any other key since the teeter rail can no longer enter into the recesses 27 of the other key levers. The teeter bar thus operates as an interlock. An arm 28 firmly connected with the teeter bar is linked to a vertically displaceable rail 29 (Fig. 2). Rail 29 acts upon an arm 32 (Figs. 2, 1) of a bridge member 31 (Figs. 1, 6) which forms part of an escapement mechanism for a spring-driven stepping drive to operate the contact star assembly.

The escapement has a bracket 30 firmly joined with the frame structure of the machine. Bracket 30 carries two aligned pivot screws 33 on which the bridge member 31 is journalled. Two detents 34 and 35 are pivotally mounted on bridge member 31 in different parallel planes and are biased to normal position by respective springs 36 and 37. Detent 35 bears against a tooth of a ratchet 38 firmly joined with a coaxial pinion 39 meshing with gear teeth of a spring housing 40 firmly mounted on the shaft 17 of the contact assembly 21. The spring 41 of the stepping drive has one end secured to a side wall 42 of the apparatus, while the other spring end is fastened to the spring housing 40. When the spring is wound up and tensioned in the manner described in a later place, it tends to turn housing 40 and shaft 17 counterclockwise (Fig. 6). However, the detent 35 resting against a tooth of ratchet 38 normally prevents such movement.

As mentioned, the actuation of any one key causes the teeter bar 25 (Fig. 2) and the pertaining arm 28, acting on the vertically movable rail 29, to move the arm 32 of the bridge member 31 (Fig. 6) downwardly. Thus the bridge member 31 is turned about the axis of pivot screws 33. This moves the detent 35 laterally out of engagement with ratchet 38, while pawl 34 simultaneously enters into the ratchet range and moves into the plane previously occupied by detent 35. Ratchet 38 is now free to turn clockwise under the driving force of spring 41 until pawl 34 abuts against the next following ratchet tooth. When thereafter the arm 32 of the bridge member 31 is released by the return movement of the key lever 8 and the return movement of rail 29 (Fig. 2), the bridge member 31 moves back into the normal position of Fig. 6 under the biasing force of its return spring 32a. This causes the pawl 34 to move out of the plane of ratchet 38 while the detent 35 returns into this plane. The withdrawal of pawl 35 releases the ratchet 38 so that it can move forward under the driving force of spring 41 until the detent 35 abuts against the tooth previously engaged by the pawl 34. At the end of this operation, the shaft 17 and the contact star assembly 21 mounted thereon have moved one step corresponding to one tongue division.

During the operation so far described, the key lever 8 then being actuated causes one of the contact tongues 20 of the correlated contact star 16 to enter into electric contact engagement with the contact rail 22–1, while the corresponding tongues of all other contact stars, though now adjacent to the same contact bar 21–1, remain electrically disengaged therefrom. How this selective engagement between the proper tongues of the one contact star correlated to the depressed key comes about will be described presently.

When a key lever 8 is being depressed, the slide cam 15 (Fig. 2) of that key lever slides downward in front of the first tongue 20 and behind the second tongue of the correlated contact star 16. As mentioned, the teeter rail 25, moving slightly in the counterclockwise direction, controls the stepping drive to move the entire contact star assembly 21 one division ahead. During this movement of all contact stars, the slide cam 15 (Fig. 3) forces the tongue 20 of the adjacent contact star toward the right so that this tongue enters behind the nearest tooth of contact bar 22–1 (see also Fig. 4). Such a deflected tongue is shown in Fig. 3 at 87. The elastic tongue 20 thus deflected forms a conductive connection between the rotatable contact star and the stationary contact bar. Once a tongue 20 is thus deflected, it remains in the deflected position during the further revolution of the star assembly and passes sequentially from bar to bar without being capable of returning to its normal position, this being due to the fact that the contact bars 22–1 to 22–49 are too closely spaced from each other.

It will be recognized from the foregoing that whenever a selected individual key lever is depressed, it causes the contact star assembly to move one step forward, while a contact tongue 20 of only the one correlated contact star is placed into contact engagement with the contact bar 22–1. During the next following advancing steps of the contact star assembly, controlled by the actuation of either the same key or any other key, the first established contact moves from bar 22–1 to bar 22–2 and so forth, while a new contact engagement of a selected contact star with the first bar 22–1 is effected. As will be explained in a later place, the data entered into the machine by actuation of the key-board assembly are thus stored in the proper sequence and are available for the control and actuation of the subsequently operating machine components at any desired moment. Before describing this more in detail, an explanation of further details of the storing apparatus will be given.

The space bar 4 (Figs. 1, 2) for entering idle steps or blank spaces into the lines of data to be entered is revolvably mounted on a shaft 43. Like the keys, the space bar 4 actuates the stepping drive of the contact star assembly, but there is no contact star correlated to this bar and the pertaining key lever does not have the particular design required for coaction with the stepping drive.

The back-space key 6 provides the possibility of correcting the last entered character or value. Key 6 is rotatable about a pin 44 (Figs. 1, 6) and is retained in its normal position by a spring 45 (Fig. 6). When key 6 is being depressed, a link 46, pivotally joined with the key, turns a segment 48 upwardly about a pivot pin 47 (Figs. 6, 1). A pawl 49 (Fig. 6) pivotally mounted on segment 48 is thus moved upwardly against a tooth of ratchet 38. The ratchet is turned counterclockwise and moves the contact star assembly 21 one division in the reverse direction.

For compelling the operator to completely depress the back-space key 6, the segment 48 has teeth 51 coacting with a stationarily pivoted pawl 50. If the back-space key 6 is only partially depressed, pawl 50 enters into the teeth of segment 48 and prevents the return movement of the key. A further description of this detail appears unnecessary since it is essentially a well-known full-stroke lock.

To prevent the back-space key 6 from being actuated when the star assembly is in its initial position, the star shaft 17 carries a stop arm 55 (Fig. 6) which rotates together with the assembly. Arm 55 cooperates with a lever 56 pivotally mounted on segment 48. When the contact star assembly is in its initial position and an attempt is made to actuate the back-space key 6, the nose 57 of lever 56 abuts against arm 55 and blocks the key.

For blocking the entire keyboard field when several key levers are being actuated simultaneously, the machine is equipped with an additional exclusion lock. This lock becomes effective when the motor bar 5 is depressed and also during and after the actuation of the correction key 7 whose function is still to be described. The exclusion lock is also to operate during the depressing movement of the back-space key 6. While the exclusion lock is only partially apparent from Figs. 1 and 2, it is shown in detail in Fig. 10. The guide comb 9 carries two pins 59 on which respective pendulums 60 are pivoted. A locking rail 58 is pivotally attached to the pendulums 60 so that the rail 58 is displaceable within limits in parallel relation to itself. Two latch members 61 are pivotally mounted on rail 58. Each latch has an angularly bent lug 62 which permits the latch a slight rotary movement relative to rail 58. Each latch 61 is connected with the adjacent pendulum 60 by an expansion spring 63. The lock rail 58 is biased by a double acting spring 93 tending to hold the rail 58 in the illustrated normal position but permitting a rail movement to either side.

When the correction key 7 is being depressed, the pertaining key lever moves downward against a projection 52 of the one adjacent pendulum 60. The pendulum, moving clockwise, shifts the locking rail 58 laterally (to the left in Fig. 10) to such an extent that a latch 64, biased by the force of a spring 65, moves behind a projection 66 of rail 58. This lateral displacement of the locking rail causes its raised parts to pass beneath the levers 8 of the keyboard. While these key levers were previously located above recesses of the locking rail and hence were free to move downward, they are now locked against any actuation.

In the just-mentioned condition, the nose of latch member 61 bears against the depressed correction key lever 7 and passes beneath that lever as soon as the lever moves back upwardly. As a result, the correction key is then also blocked against repeated actuation.

The same design is provided for the lever 67 of the motor bar 5.

For releasing the locked keys, a releasing lever 68 (Figs. 1, 8, 9, 10) is provided. This lever is not operable manually and therefore terminates at the height of the guide comb 9 (Fig. 9). When the release lever 68 is actuated in the manner described below, it presses against the latch 64 (Fig. 10) and moves it out of the latching position thus releasing the locking bar 58 for return movement under the force of spring 93.

The locking of the keys during the depression of back-space key 6 is effected by means of a cam piece 69 (Fig. 10) riveted to the locking bar 58. When the lever of key 6 is being depressed, it displaces the cam piece 69 and hence the locking rail 58 laterally (toward the right in Fig. 10) with the result of locking the keyboard field. This locking is effective only as long as the back-space key 6 remains depressed.

Figure 7:
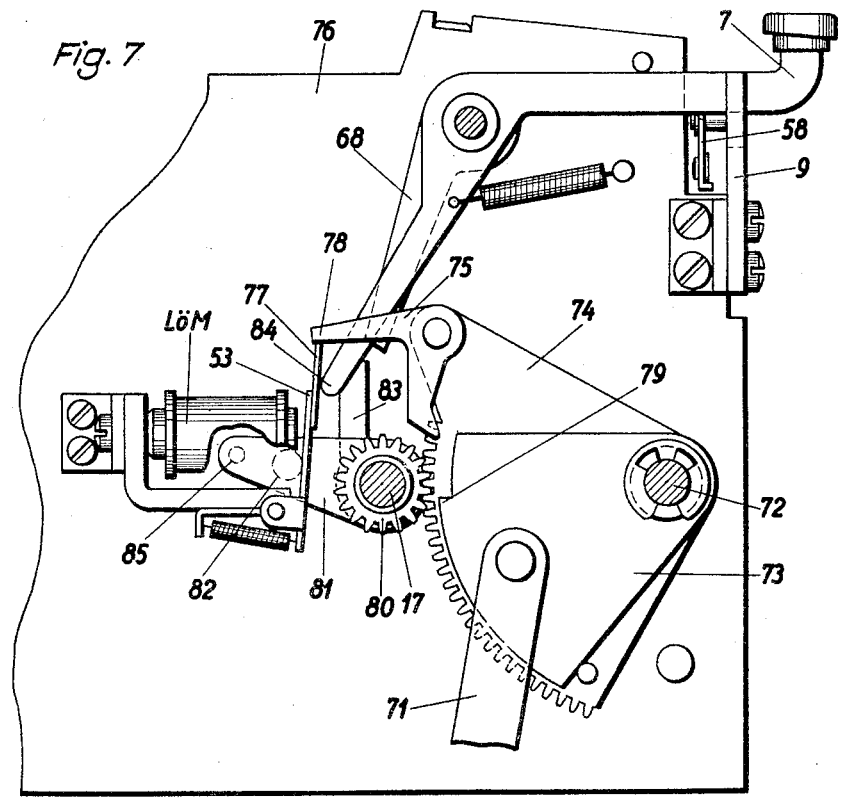
Fig. 7 is a view taken from the left of Fig. 1 and shows a tensioning device for the stepping drive as well as a correlated correction key.

The above-mentioned tensioning of the stepping drive spring 41 and the conjoint return movement of the contact star assembly 21 into the initial position is effected by the main drive of the machine. A crank member 70 (Figs. 9, 14) is connected with the main drive (MD in Fig. 14) by a step down gearing. A link 71 connects crank 70 with a segment 73 rotatable about a stationary pivot pin 72 (Figs. 9, 7). A spur gear segment 74 is pivoted on the same pin 72 and is rotatable independently of segment 73. The gear segment 74 carries a pivotally movable coupling pawl 75. Pawl 75 cooperates with a reset magnet M (Figs. 7, 14) mounted on a frame plate 76 (Fig. 7). After the stored data are carried over from the storing apparatus into the machine components to be actuated or controlled in accordance with these data, a switch contact (SC in Fig. 14) applies voltage to magnet M so that the magnet armature 53 (Fig. 7) is attracted. An abutment piece 77 is riveted to the armature 53. When the armature is in the normal position shown in Fig. 7, an arm 78 of a coupling pawl 75 rests upon the abutment piece 77. When the armature 53 is attracted by magnet M, the coupling pawl 75 is released and turns clockwise so that its pawl nose end enters into a recess 79 of segment 73, then assuming the position illustrated in Fig. 9. The gear segment 74 is thus coupled with the segment 73 and is entrained thereby. A pinion 80 meshes with the gear segment 74. Pinion 80 is firmly joined with an arm 81 and both are revolvably mounted on the shaft 17 so that they may rotate independently of the shaft. When pinion 80, after pawl 75 has coupled gear segment 74 with driving segment 73, is placed in revolution, a lateral dog pin 82 on arm 81 presses against a stop 83 firmly connected with the shaft 17. Pin 82 then turns stop 83 and hence shaft 17 as well as the contact star assembly back into the initial position and simultaneously tensions the stepping drive spring 41. When thereafter the reset magnet M is de-energized so that its armature 53 drops off into the position shown in Fig. 7, the coupling pawl 75, during the return movement of gear segment 74, is caught by the abutment piece 77 so that the pawl 75 turns counterclockwise about its pivot and releases the coupling engagement between segments 73 and 74.

The coupling for the tensioning and resetting of the stepping drive may also be controlled by the correction key 7 (Fig. 7). The lever of this key has an extension 84 which rests against the abutment piece 77 and forces the armature 53 toward the magnet M when the correction key 7 is depressed. The movement of armature 53 then initiates the same operation as described above. The actuation of correction key 7 thus results in a complete resetting of the data storing apparatus before the stored group of data is carried over into the subsequently operating machinery by the actuation of the motor bar 5.

Figure 8:
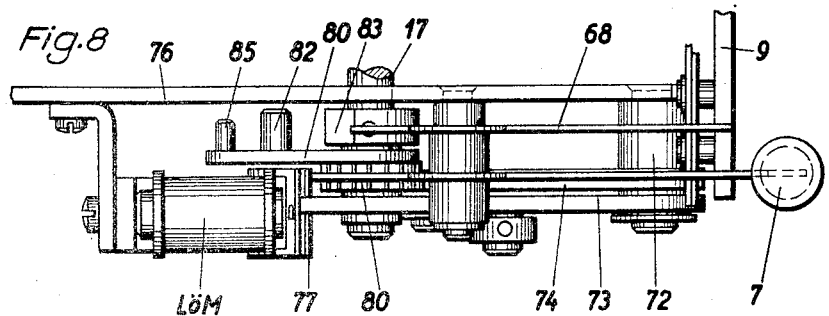
Fig. 8 is a top view of the parts shown in Fig. 7.
Figure 9:
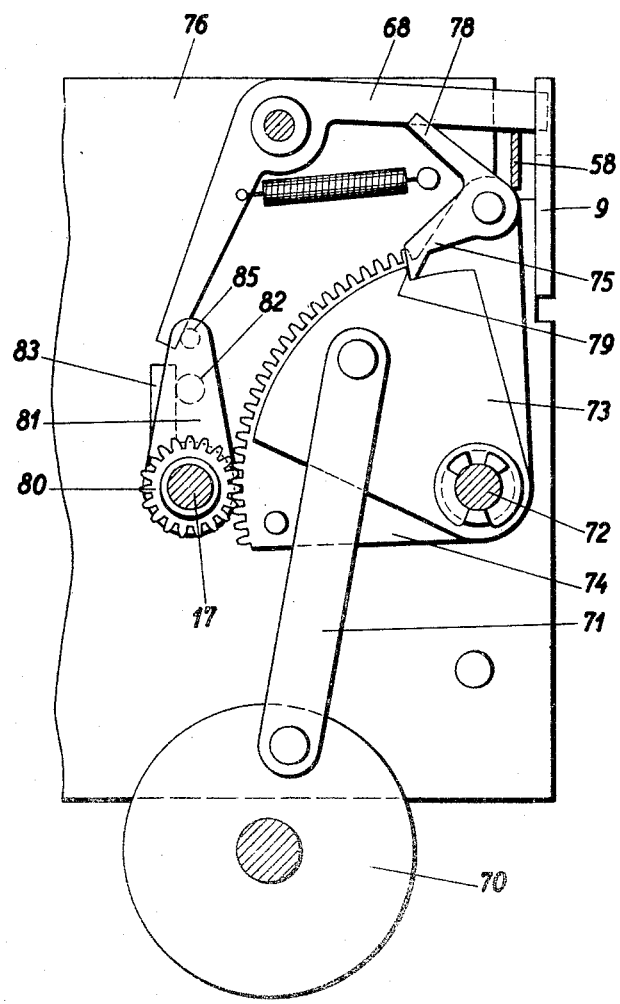
Fig. 9 is similar to Fig. 7 and shows the tensioning device in a different position of operation.
Figure 10:
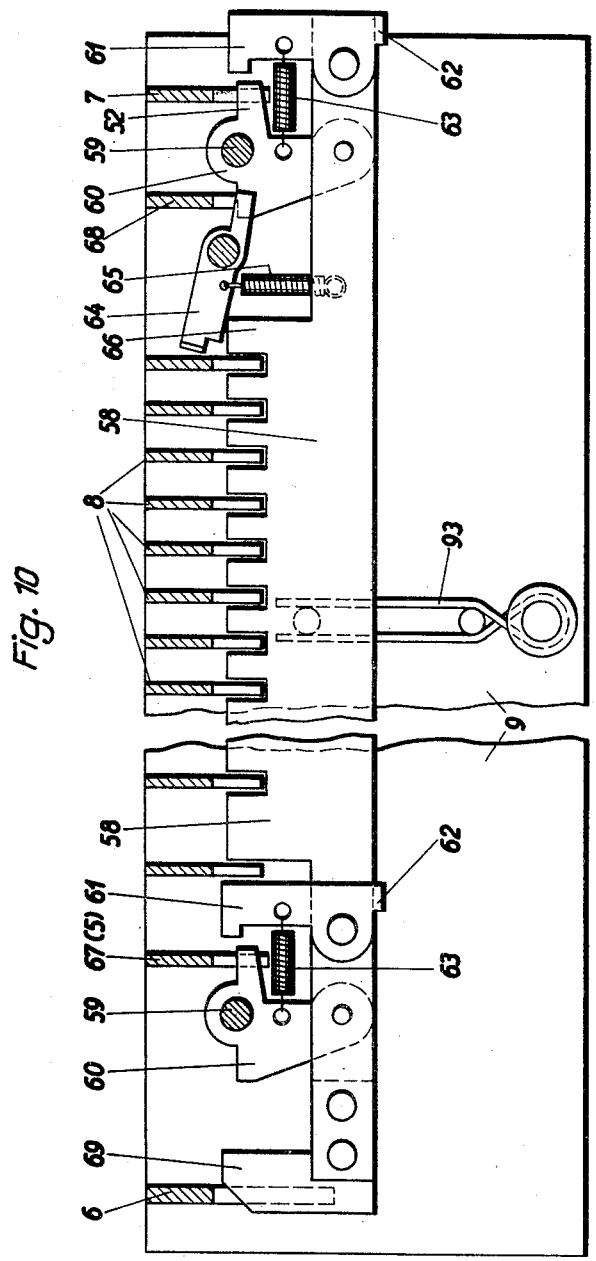
Fig. 10 is a part sectional view showing a key interlocking device of the apparatus.

The above-mentioned actuation of the lock release lever 68 (Figs. 1, 7 to 10) occurs during the described resetting of the contact star assembly 21 and is controlled by another dog pin 85 laterally projecting from the end of arm 81 on shaft 17 (Figs. 7 to 9). When the segments 72, 74 approach the position in which the shaft 17 and the star assembly are nearly returned to the initial position, the dog pin 85 abuts against the release lever 68 (Fig. 9) and turns it clockwise. As a result, the blocking of the keyboard occurring, as described, when the motor bar 5 or the correction key 7 are depressed, is eliminated.

By virtue of the coaction between the above-described individual components and operations, the data storing apparatus is capable of operating much in the manner of an electric cross bar distributor. That is, during the stepwise forward movement of the contact star assembly 21, the pertaining contact tongues 20 pass sequentially along the series of contact bars 22–1 to 22–49 in such a manner that the electric contact last established occurs always at bar 22–1. Commencing from bar 22–1, the stored data occupy successively as many places as contact bars are engaged by the contact tongues 20. That is, any key, when depressed, causes the one correlated contact star 16 to make contact with bar 22–1. When the next key is depressed, the contact star of the first depressed key moves one step and thus makes contact with bar 22–2, while the contact star correlated to the second depressed key makes contact with bar 22–1. The actuation of a third key causes the two previously established contacts to move one step ahead so that they now occupy bars 22–3 and 22–4 while the contact star of the third depressed key engages bar 22–1, and so forth. Consequently, when a group of data (text or amounts, including idle spaces) are entered into the machine, the resulting setting of the contact stars relative to the contact bars is indicative of the contents and sequence of these data by closing a correspondingly selected group of electric circuits between the respective bars 22 and the respective terminals 18 (Fig. 2) of the contact stars.

Figure 13:
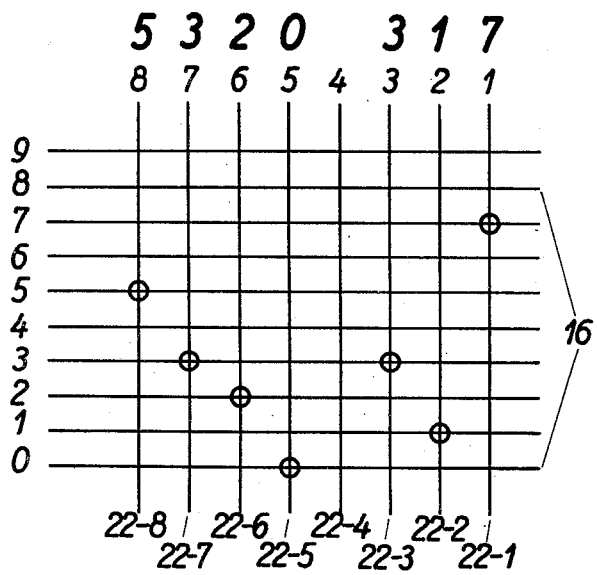
Figs. 12 and 13 are explanatory diagrams relating to the electric operation of the apparatus.
Figure 12:
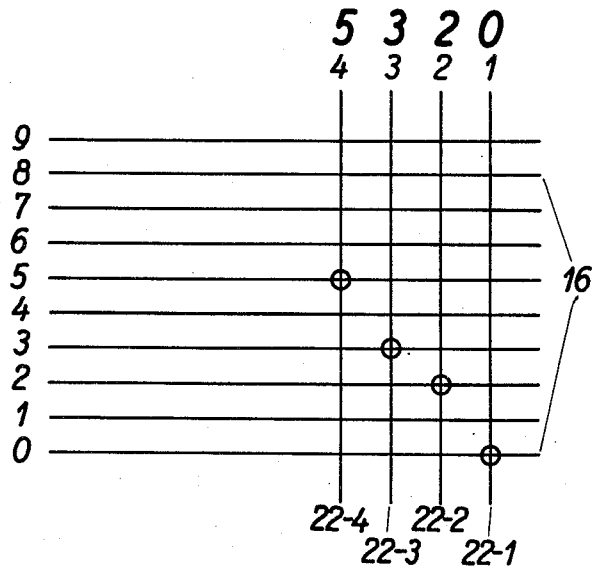

For further elucidating this operating, the storing of the number sequences 5320 and 5320 317 will presently be explained on the basis of the schematic illustrations in Figs. 12 and 13. In both figures, the heavy vertical lines represent the contact bars 22 of which only those needed for an understanding of the chosen examples are indicated. The reference numbers 21–1 to 22–4 applied to the bars in Fig. 12 correspond to the respective reference characters in Fig. 2. The horizontal heavy lines in Figs. 12 and 13 represent the contact stars 16 for the respective numbers 0, 1, 2 . . . 9 of the number field of the keyboard assembly. A circle around an intersection represents a conductive connection between contact star and contact bar effected by actuation by a machine key.

It will be recognized from Fig. 12 that the first key actuated was that denoting the number "5." The corresponding electric contact was first established between contact bar 22–1 and contact star 16–5. During the next following three actuations of respective machine keys, the contact engagement travelled along bars 22–2 and 22–3 to bar 22–4. The last actuated key, denoting "0," established contact between star 16–0 and bar 22–1. As mentioned, the setting represented in Fig. 12 corresponds to the number "5320."

The set-up shown in Fig. 13 corresponds to the number combination "5320 317," that is, a space and the number 317 are put into the machine in addition to the number previously set up according to Fig. 12. A comparison of Fig. 13 with Fig. 12 shows that item "5" (i. e. the contact engagement indicative of "5") has moved from the fourth contact bar 22–4 to the eighth contact bar 22–8, and that the last entered item "0" (Fig. 12) or "7" (Fig. 13) is represented by the contact bar 22–5. The spacing between "5320" and "317" in the setting according to Fig. 13 is effected by depressing the space bar 4 (Fig. 1). The actuation of bar 4 does not establish a contact with any of the contact bars since no contact star 16 is correlated to space bar 4, but the actuation of the space bar nevertheless "occupies" a contact bar, namely bar 22–4 in Fig. 13, due to the fact that the star assembly moves one step ahead when space bar 4 is depressed.

Figure 14:
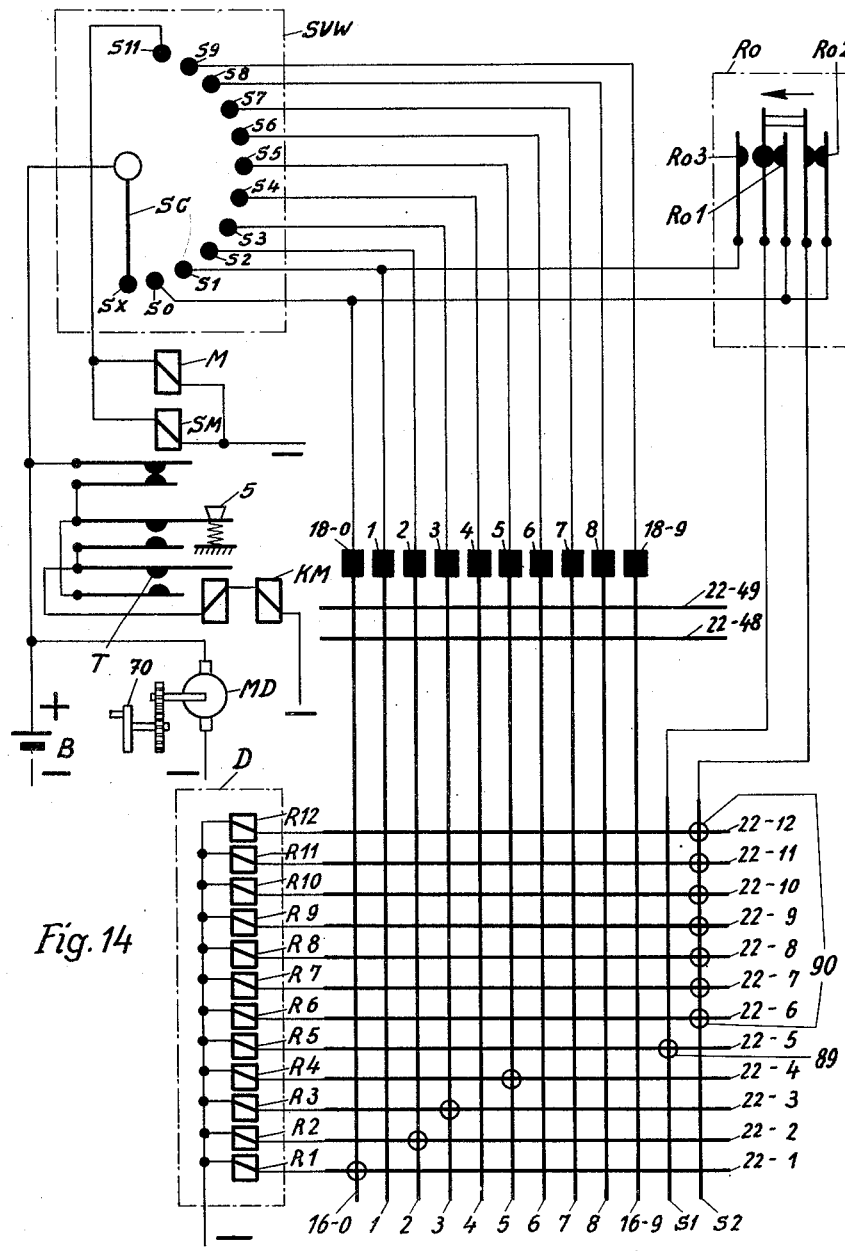
Fig. 14 is the circuit diagram of a translating device for controlling a printer in accordance with the data stored in the apparatus of Figs. 1 to 13.
Figure 15:
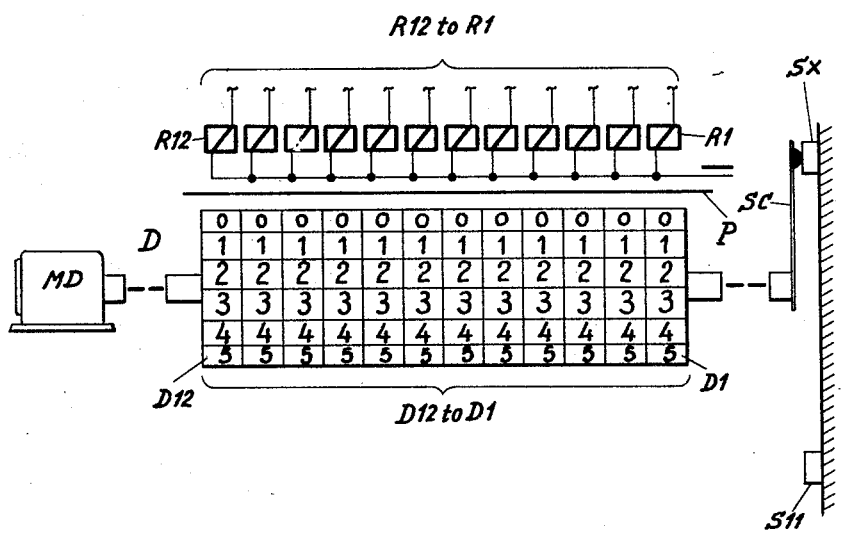
Fig. 15 shows schematically the printing mechanism.

After a group of data are thus entered into the storing apparatus of the machine, the stored data are available at any time for transmittal to a subsequently operating machine section such as a printing, punching or calculating device. An example of suitable transmitting means is schematically represented in Figs. 14 and 15 and will be described in a later place.

For some accounting purposes it is also desired to have the machine automatically supplement an entered sequence of figures by a number of zeros up to a given number of decimal positions. Assume, for instance, that each complete entry is to consist of twelve decimal positions. When only three individual digit values are entered, the machine must automatically supplement nine zeros; when five digit values are entered, seven zeros must be supplemented, and so forth. This requirement can readily be satisfied by providing the assembly 21 with a supplementary contact star not subject to control by a machine key.

Figure 11:
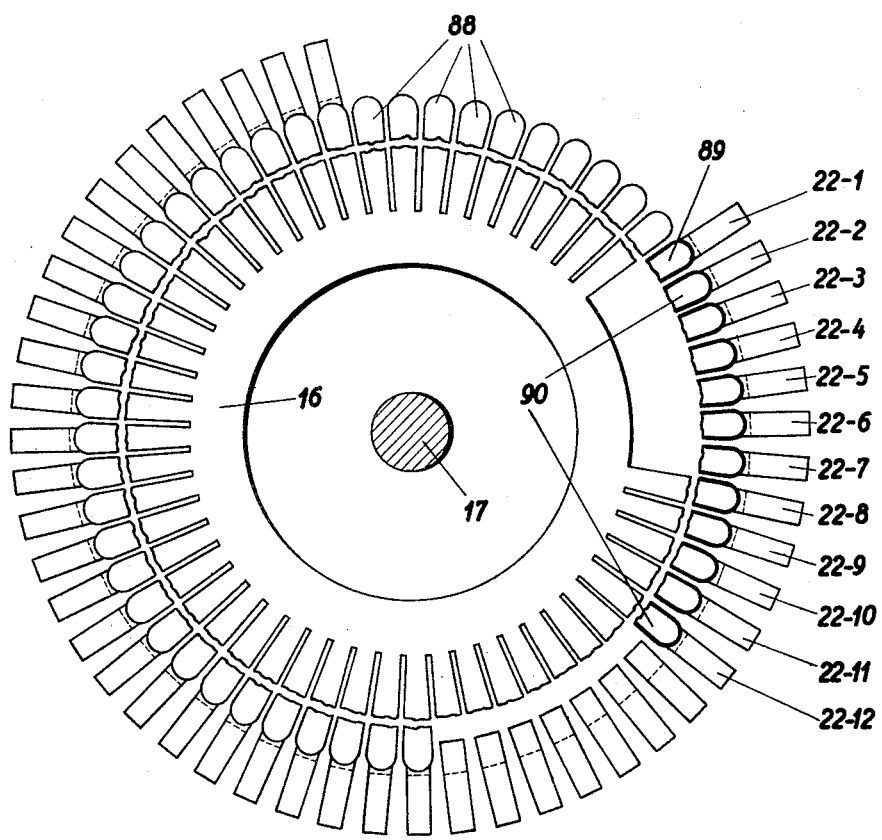
Fig. 11 shows a special contact star forming part of the movable contact assembly of the apparatus.

In Fig. 11 the contact star 16 shown broken away is a normal star correlated to one of the machine keys, while the radially outer parts 88, 89, 90 of the star tongues pertain to the supplementary star. The tongues 89 and 90 shown by heavy lines are bent laterally prior to inserting the star into the apparatus so that the tongues 89, 90 will slide onto the contact bar 22–1 on their own account, that is without being deflected by a slide cam (15, Fig. 2). That is, the tongues 89, 90 are permanently bent to the shape shown at 87 in Fig. 3. The other contact tongues 88 of the special star are not bent laterally and serve only for the supply of electric current in coaction with the contact piece 18 (shown in Fig. 2). The supplementary star thus designed is displaced twelve tongue divisions ahead of the normal contact stars 16 (Fig. 11) and is electrically connected in the sense of the figure "0" (i. e. to relay RO in Fig. 14) and consequently establishes contact with the contact bars in such a manner as to place supplementary zeros in front of the entered figures if the entered sequence of figures has less than twelve positions. That is, the apparatus will supplement as many zeros as the star tongues 89, 90 have connections with the contact bars. If the entered number has twelve positions in itself, then all tongues 88, 90 of the special star have left the range of contact bars 22–1 to 22–12 so that no zero will appear in front of the entered figures.

According to another modification, the contact tongues for the supplementing of zeroes may be provided on two separate stars in such a manner that the tongue 89 is located on one star and the tongues 90 on the other. Both stars are electrically connected to the character "0" for the supplementing of zeros as described. This connection, for instance, may be releasable by a relay (Ro in Fig. 14) at a desired moment. This makes it possible to set the apparatus selectively for a different setting-up operation in such a manner that no zeros are supplemented and instead an identifying character or mark is automatically placed ahead of the sequence of entered numbers. For such an operation the star tongues 90 are separated from the "0" conductor by the just-mentioned relay, while the star with the tongue 89 is electrically connected to the conductor pertaining to the particular identifying figures, mark or other character. The resulting operation, for example, may be such that the operator can enter the account number 5320 into the machine, while the group of characters actually stored and later transferred and utilized corresponds to the number group 1 5320. The figure "1" may then indicate that the machine is set for an accounting classification "1." By changing the electric connection, any desired figure or character may thus be automatically placed ahead of the account number. If desired, the identifying supplement, automatically added by the machine, may also be given two or more positions by correspondingly subdividing the tongues 89 and 90.

The just-mentioned supplementing operations and the means required therefor will be more fully understood from the description, following presently, of the apparatus shown in Figs. 14 and 15. The apparatus serves to translate stored numerical data by transmitting them to a subsequently operating machine section such as a printing or hole punching device.

The lower portion of Fig. 14 shows schematically some of the contact bars 22–1 to 22–12, 22–48, 22–49 and the contact stars 16–0 to 16–9 of the apparatus in much the same manner as these parts are shown in Figs. 12 and 13; and a circle around an intersection again denotes a conductive connection between a contact star and a contact bar. It will be recognized that the number 5320 is stored in the same manner as explained above with reference to Fig. 12. In addition to its ten contact stars 16–0 to 16–9 that correspond to the ten digit values of a decimal position, the apparatus has two of the above-mentioned special stars S1 and S2. Stars S1 and S2 serve to supplement each stored numerical entry by zeros up to a total of twelve decimal positions, and star S1 may also serve to add an identifying number to the entry, both stars operating as described above and more fully explained below. The contact stars 16–0 to 16–9 are connected to respective terminals 18–0 to 18–9.

The portion of the apparatus of Fig. 14 so far mentioned forms part of a storing device designed in accordance with Figs. 1 to 13 and is connected with the data translating means now to be explained.

The terminals 18–0 to 18–9 are electrically connected with respective bank contacts S0 to S9 of a selector switch SVW. The contact bars 22–1 to 22–12 are connected with respective magnets R1 to R12 of a printing or punching mechanism D or a similarly controllable device to be operated in accordance with the stored data. The magnets R1 to R12 are all parallel connected to the minus pole of a current source B.

The selector SVW has a rotatable contact arm SC connected to the positive pole of the current source B. Also connected to the positive pole are the contact of the motor bar 5 (see also Fig. 1) and the main drive motor MD of the machine. The motor MD is constantly running as long as the machine is in operative condition and is temporarily coupled with the contact arm SC when a coupling magnet KM is energized through a contact T under control by the motor bar 5.

The motor MD also drives the mechanism D of which an example is schematically shown in Fig. 15. The illustrated mechanism D is designed for printing numerical entries of twelve decimal positions and has a revolving assembly of twelve type carriers D1 to D12, each carrying a peripheral row of types denoting the figures 0 to 9. A paper tape P passes by the carrier assembly but remains at rest during each full revolution of the assembly. The above-mentioned magnets R1 to R12 are coordinated to the respective type carriers D1 to D12. During the continuous, or preferably stepwise, revolution of the carrier assembly, identical digit figures of all carriers D1 to D12, for instance all zeros, are simultaneously in the printing position adjacent to the tape P, but an imprint is produced only at those places where a magnet is energized at that time. For example, when all zeros are in the printing position but only the magnets R1 and R6 are energized, then a zero is printed upon the tape P in the first and sixth decimal positions only; or when all twos are opposite the tape P but only the magnet R2 is energized, a two will be printed only in the second decimal position.

Assume that the number 5320 has been entered into the storing apparatus as described above and that this stored number is to be transferred to the printer D, then the operator depresses the motor bar 5 (Figs. 1, 14). This closes the circuit of coupling magnet KM and causes a holding relay to close a self-holding contact T (Fig. 14) which thereafter remains closed through a normally closed set of contacts associated with a release relay SM until opened by subsequent energization of the release relay as described below. Contact T maintains the current supply for the coupling magnet KM which couples (by a magnetic coupling not illustrated) the main drive motor MD with the selector arm SC. Arm SC moves counterclockwise (Fig. 14) and leaves contact SX to sequentially pass over all other bank contacts. When arm SC reaches the bank contact S0, it closes a circuit (+), SC, 18–0, 16–0, 22–1, R1, (—) through magnet R1. At that moment, all zeros of assembly D are in printing position (Fig. 15), so that magnet R1, when responding, causes a zero to be printed by type carrier D1 in the first (unit) decimal position.

The two special stars S1 and S2 are also connected, through respective contacts Ro1 and Ro2 of a control switch or relay Ro, with the bank contact S0. Consequently, when selector arm SC engages bank contact S0, an energizing circuit is also completed at point (tongue) 89 of star S1 throughout contact Ro1, contact bar 22–5 and magnet R5; and parallel circuits are closed for magnets R6 to R12 from contact S0 through contact Ro2 and seven points (tongues) 90 of star S2. As a result, the eight magnets R5 to R12 are all energized together with magnet R1 and cause zeros to be simultaneously printed in the corresponding decimal positions. Thus the first partial imprint produced when selector arm SC reaches bank contact S0 places all zeros of the twelve-position entry upon the tape:

00000000 . . . 0

When thereafter the selector arm SC reaches the next bank contact S1, all ones of the type carrier assembly (Fig. 15) are in printing position but none of them is printed upon the tape P because no "1" is entered in the storing apparatus and the contact star 16–1 does not contact any of the contact bars so that none of the magnets R1 to R12 is energized.

When arm SC reaches bank contact S2 (Fig. 14), it closes a circuit through star 16–2, bar 22–2 and magnet R2. All twos of the type carrier assembly are now in printing position. Hence, magnet R2 causes a "2" to be printed in the second decimal position:

00000000 . . 20

In an analogous manner, the selector arm SC, when reaching the contact S3 energizes the magnet R3 to print a "3" to be added in the third decimal position; and when arm SC reaches the contact S5, relay R4 is energized so that a "5" is added in the fourth decimal position, thus completing the print:

000000005320

Thereafter the arm SC passes ineffectively over contacts S6 to S9 and reaches the last contact S11. Now a circuit is closed through reset magnet M (see also Figs. 7, 8), and a release relay SM is energized simultaneously. The release magnet M, as described above, couples shaft 17 of the star assembly 21 with the main drive so that the assembly is reset to the starting position, while the reset relay SM causes the contact T to be opened thus deenergizing the coupling magnet KM and uncoupling the selector SVW from the main drive MD. The selector arm now again occupies the starting position in which it engages the contact SX.

The translating operation described in the foregoing is substantially the same if only one special star is used instead of the two stars S1, S2 or if no special star is employed. In the latter case, of course, there is no automatic entry of supplementary zeros.

The control switch (relay) Ro permits setting the apparatus either for supplementing zeros as described above, or for supplementing one or more identifying numbers or characters also as pointed out previously. For switching the apparatus to the latter operation, the contacts of relay Ro are moved in the direction of the arrow so that contacts Ro1 and Ro2 remain open while contact Ro3 is closed. This interrupts the circuits of special stars S1 and S2 that operate to supplement zeros. Instead, the special star S1 is now connected by contact Ro3 to bank contact S1. Hence, when selector arm SC reaches contact S1 and all ones are in printing position, the one magnet (magnet R5 in Fig. 14) then energized will cause a "1" to be printed. In the described example, this occurs in the fifth decimal position. Consequently, the total print produced during a complete cycle of the arm SC will read:

15320 that is, it automatically adds to the number 5320 entered into the apparatus, the identifying figure "1." Obviously, any other character or several of them may thus be added by connecting the special star with the one or more bank contacts that are correlated to the desired supplementary character.

The modification illustrated in Figs. 2, 3 and 5 involves a substitution of the contact bars 22 by bars 91 of a different design. While the above-described contact bars 22 consist throughout of metal, the bars 91 have a main body of insulating material with inserted contact pins 92 which take the place of the contact teeth or projections previously described in conjunction with bars 22. The essential functioning of all parts in the modified apparatus remain the same, but the modification offers the additional advantage that within any of the contact bars 91, the contact pins 92 may be electrically interconnected in any desired grouping. This amounts virtually to a subdivision of the above-described bars 22 into mutually insulated contact sections. While the modified contact bars 91, 92 are shown in Figs. 2 and 3 as part of an apparatus which also contains contact bars 22, it will be understood that it is generally preferable to use the same type of contact bar within a single machine.

It will be obvious to those skilled in the art, upon a study of this disclosure, that my invention permits of various modifications, especially with respect to design details. For instance, if desired, the progressive movement of the contact assembly in the storing device may be linear with a corresponding linear succession of the pertaining movable and stationary contact elements.

I claim:

1. Data-storing apparatus for business machines, particularly accounting machines and the like, comprising selectively operable means for entering the data, a storing assembly having a first group of coaxially disposed circular electric contact members correlated to said respective entering means, each one of said first group of electric contact members comprising a plurality of circumferentially spaced contact elements, said elements being movable from one to another position under control by said respective entering means, a second group of electric contact members peripherally arranged with respect to said first group of electric contact members, each of said second group of contact members being aligned with a row of said elements comprising one element of each of said first group of contact members, said second group of contact members being in contact engagement with elements when said elements are in a given one of said two positions, a multitude of electric selector circuits including said first members and said second members for operation in accordance with the relative positions of said elements, said first group of contact members being incrementally rotatable about said contact members of said second group by an amount corresponding to the spacing between successive ones of said circumferentially spaced contact elements, said rotation being controlled by operation of said data entering means, whereby a progressively increasing number of said circuits are prepared for operation in a selected combination corresponding to the entered combination of data.

2. Data-storing apparatus for business machines, particularly accounting machines and the like, comprising selectively operable means for entering the data, a storing device having an incrementally rotatable contact assembly and having a stepping drive operatively connected with said entering means to advance said assembly one step upon any selective actuation of said entering means, said assembly comprising a group of simultaneously rotatable contact members insulated from one another and correlated to said respective entering means each one of said rotatable group of electric contact members comprising a plurality of circumferentially spaced contact elements, said elements being individually movable laterally from an inactive to an active position under control by said respective entering means, a group of stationary contact members peripherally arranged with respect to said group of rotatable contact members, each of said group of stationary contact members being aligned with a row of said elements comprising one element of each of said rotatable group of contact members, said stationary group of contact members being insulated from one another and in contact engagement with those contact elements of said rotatable members that are in said active position, and a multitude of electric selector circuits including said rotatable and said stationary contact members, whereby a progressively increasing number of said circuits are prepared for operation in a selected combination corresponding to the entered combination of data.

3. Data-storing apparatus for business machines, particularly accounting machines and the like, comprising selectively operable means for entering the data, a storing device having an incrementally rotatable contact assembly and having a stepping drive operatively connected with said entering means to advance said assembly one incremental step upon any selective actuation of said entering means, said assembly comprising a coaxially aligned group of contact stars insulated from one another and correlated to said respective entering means, each of said stars having a number of radial contact tongues laterally deflectable under control by said entering means, the incremental step rotary advancement of said assembly being of an amount corresponding with the spacing between successive ones of said radial tongues, a group of stationary and mutually insulated contact members peripherally distributed about said contact stars, each of said group of stationary contact members being aligned with a group of said radial tongues comprising one each of said stars, said group of stationary contact members being in sliding engagement with only the laterally deflected ones of said tongues, and electric selector circuits including said contact members and electrically connected with said respective contact stars, whereby a progressively increasing number of said circuits are prepared for operation in a selected combination corresponding to the entered combination of data.

4. In data-storing apparatus according to claim 3, said contact stars being coaxially joined with each other, and each of said stationary contact members extending parallel to the axis of said assembly and having a multitude of conductive projections directed toward said axis and engageable with one of said respective tongues at a time.

5. In data-storing apparatus according to claim 4, said conductive projections being insulated from each other and having respective terminals forming part of said respective circuits.

6. Data-storing apparatus for business machines, particularly accounting machines and the like, comprising selectively operable means for entering the data, a storing device having an incrementally rotatable contact assembly and having a stepping drive operatively connected with said entering means to advance said assembly one incremental step upon any selective actuation of said entering means, said assembly comprising a group of rotatable contact members insulated from one another and correlated to said respective entering means, each one of said rotatable group of electric contact members comprising a plurality of circumferentially spaced contact elements, said elements being individually movable laterally from an inactive to an active position under control by said respective entering means, stationary contact terminal structures in sliding engagement with said respective rotatable contact members, a group of stationary and mutually insulated contacts peripherally distributed about said rotatable contact members, each of said group of stationary contacts being aligned with a row of said elements comprising one element of each of said rotatable group of contact members, said group of stationary contacts being in sliding engagement with those contact elements of said rotatable members that are in said active position, the incremental step rotary advancement of said assembly being of an amount corresponding with the spacing between successive ones of said contact elements, whereby a progressively increasing number of electric circuits are prepared between said respective terminal structures and said stationary contact members in a selection indicative of the combination of entered data.

7. Data-storing apparatus for business machines, particularly accounting machines and the like, comprising a keyboard having selectively operable key means for entering the data to be stored, a storing device having a rotatable contact assembly and a stepping drive connected with said assembly and controllable by said key means to advance said assembly one incremental step upon any selective actuation of said means, said assembly comprising a group of rotatable contact members insulated from one another and correlated to said respective entering means, each one of said rotatable group of electric contact members comprising a plurality of circumferentially spaced contact elements, said elements being individually movable laterally from an inactive to an active position, each of said key means having a structure engageable with the correlated one of said rotatable contact members for mechanically moving said one contact member to said active position when said key means is being actuated, a group of stationary contact members insulated from one another and peripherally aligned about said assembly, each one of said group of stationary members being aligned with a row of said elements comprising one element of each of said group of rotatable contact members, said stationary members being in contact engagement with those contact elements of said rotatable members that are in said active position, and a multitude of electric selector circuits including said rotatable and said stationary contact members, the incremental step rotary advancement of said assembly being of an amount corresponding with the spacing between successive ones of said contact elements, whereby a progressively increasing number of said circuits are prepared for operation in a selected combination corresponding to the entered combinations of data.

8. Data-storing apparatus for business machines, particularly accounting machines and the like, comprising a keyboard having a plurality of fields of keys for respectively different entering purposes, each of said fields having selectively operable key means for entering the data to be stored, a storing device common to said plurality of fields and having a stepwisely rotatable contact assembly and a single stepping drive connected with said assembly and controllable by any one of said key means to rotatingly advance said assembly one step, said rotatable assembly having a group of mutually insulated contact members correlated to said respective key means, each one of said contact members comprising a plurality of circumferentially spaced contact elements, said elements being individually deflectable laterally from a normal to an active position under control by said respective key means, a group of stationary contact members insulated from one another and aligned along the periphery of said movable assembly, each one of said group of stationary members being aligned with a row of said elements comprising one element of each of said group of contact members, said stationary members being in contact engagement with those contact elements of said members of said assembly that are in said active position, and a multitude of electric selector circuits including said stationary members and said assembly members, the stepwise rotary advancement of said assembly being of an amount corresponding with the spacing between successive ones of said contact elements whereby a progressively increasing number of said circuits are prepared for operation in a selected combination corresponding to the entered combination of data.

9. Data-storing apparatus for business machines, particularly accounting machines and the like, comprising selectively operable means for entering the data, a storing device having a stepwisely rotatable contact assembly and a stepping drive connected with said assembly, said assembly having a group of mutually insulated contact members correlated to said respective entering means, each one of said contact members comprising a plurality of circumferentially spaced contact elements, said elements being individually deflectable transverse to the travel path of said assembly from a normal position to an active position, a group of stationary and mutually insulated contact members aligned along the periphery of said assembly and in contact engagement with said contact elements of said respective assembly members only when in said active position, each one of said group of stationary members being aligned with a row of said elements comprising one element of each of said group of contact members, mechanism connecting each of said entering means with said stepping drive for controlling it to rotatingly advance said assembly one step upon actuation of any one key means, the stepwise rotary advancement of said assembly being of an amount corresponding with the spacing between successive ones of said contact elements, and mechanism individually connecting said entering means with one of said respective assembly members for deflecting said one assembly member when the correlated one key means is actuated.

10. Apparatus for storing numerical data for business machines, particularly accounting machines and the like, comprising selectively operable means for entering the data, said selectively operable means denoting respective numerical figures, a storing device having an incrementally rotatable contact assembly and having a stepping drive operatively connected with said entering means to advance said assembly one step upon actuation of any one of said means, said assembly comprising a group of contact stars insulated from one another and correlated to said respective entering means, each of said stars having a number of radial contact tongues laterally deflectable under control by said entering means, a group of stationary and mutually insulated contact members peripherally distributed about said contact stars and in sliding engagement with only the laterally deflected ones of said tongues, and electric selector circuits including said contact members and electrically connected with said respective contact stars, said rotatable contact assembly comprising an additional contact star coaxially joined with said other stars and insulated therefrom, said additional star being independent of said entering means and having a given sequence of permanently deflected contact tongues electrically engageable with said stationary contact members and disposed in a given angular relation to said other stars for supplementing the stored numerical data by a number of zeros up to a given digital position.

11. Data-storing apparatus for business machines, particularly accounting machines and the like, comprising selectively operable means for entering the data, a storing device having a stepwisely rotatable circular contact assembly and a stepping drive connected with said assembly, said assembly having a group of mutually insulated circular contact members correlated to said respective entering means, each of said assembly members having a plurality of peripherally spaced contact elements individually deflectable transverse to the travel path of said assembly from a normal to an active position, a group of stationary and mutually insulated contact members aligned along the travel path of said assembly and extending transverse to said path, each of said stationary members having a row of projections electrically engageable with respective contact elements of different ones of said assembly members when said elements are in said active position, said assembly and said stepping drive having an initial position in which a first element of each of said assembly members has a location immediately ahead of a first one of said stationary members, individually movable deflection parts each engageable with the one contact element of said respective assembly members that is positioned at said location at a time, each of said deflection parts being connected with one of said respective entering means for deflecting a selected one of said contact elements when said one entering means is actuated, means connecting said stepping drive with each of said entering means for causing said drive to advance said assembly one step when any one of said entering means is actuated, the stepwise rotary advancement of said assembly being of an amount corresponding with the spacing between successive ones of said contact elements, whereby said first contact element while deflected by said part passes from said location into contact engagement with said first stationary member and, upon each subsequent actuation of any entering means, passes from said first stationary member sequentially to said other stationary members.

12. In apparatus according to claim 11, said deflective contact elements being normally located at one side of said projections of said respective stationary members and having a spring bias tending to hold them on said side and in spaced relation to said projections, and said contact elements being movable by said deflection parts to the other side of said projections to enter into contact engagement therewith, and said projections of respective adjacent stationary members having along said path a mutual spacing larger than the width of an individual contact element, so that an element once deflected into engagement with said first stationary member remains deflected when passing over to the subsequent stationary members.

13. In apparatus according to claim 11, said stepping drive having a driving spring tensioned when said assembly is in said initial position and having an escapement mechanism connected with said entering means for incrementally releasing said spring for operation, and operator-controllable power means connected with said assembly for resetting it to said initial position in opposition to said spring.

14. Data-storing apparatus for business machines, particularly accounting machines and the like, comprising selectively operable means for entering the data, a storing device having an incrementally rotatable contact assembly and having a stepping drive operatively connected with said entering means to advance said assembly one step upon actuation of any one of said means, said assembly comprising a group of coaxial and mutually parallel contact stars insulated from one another and correlated to said respective entering means, each of said stars having a number of circularly arranged equidistantly spaced radial contact tongues elastically deflectable in the axial direction, a group of stationary and mutually insulated contact bars extending parallel to the axis of said assembly and being aligned along part of the periphery of said assembly so as to leave another part of said periphery unoccupied, each of said bars having a row of conductive projections electrically engageable with respective tongues of different ones of said stars when said tongues are deflected, movable deflection cam pieces disposed at said unoccupied periphery part of said assembly and connected with said respective entering means, each of said cam pieces being deflectively engageable with the one tongue of one of said respective stars that is located immediately ahead of said aligned bars to place said one tongue into engagement with a projection of the first adjacent bar when the one correlated entering means is actuated, the stepwise rotary advancement of said assembly being of an amount corresponding with the spacing between successive ones of said contact tongues.

References Cited in the file of this patent
UNITED STATES PATENTS

| | | |
|---|---|---|
| 2,369,430 | Brand et al. | Feb. 13, 1945 |
| 2,573,581 | Lake et al. | Oct. 30, 1951 |

FOREIGN PATENTS

| | | |
|---|---|---|
| 622,650 | Great Britain | May 5, 1949 |